Oct. 17, 1961  H. RÜHLE  3,004,470
MULTIPLE FOCAL LENGTH LENS
Filed July 24, 1957
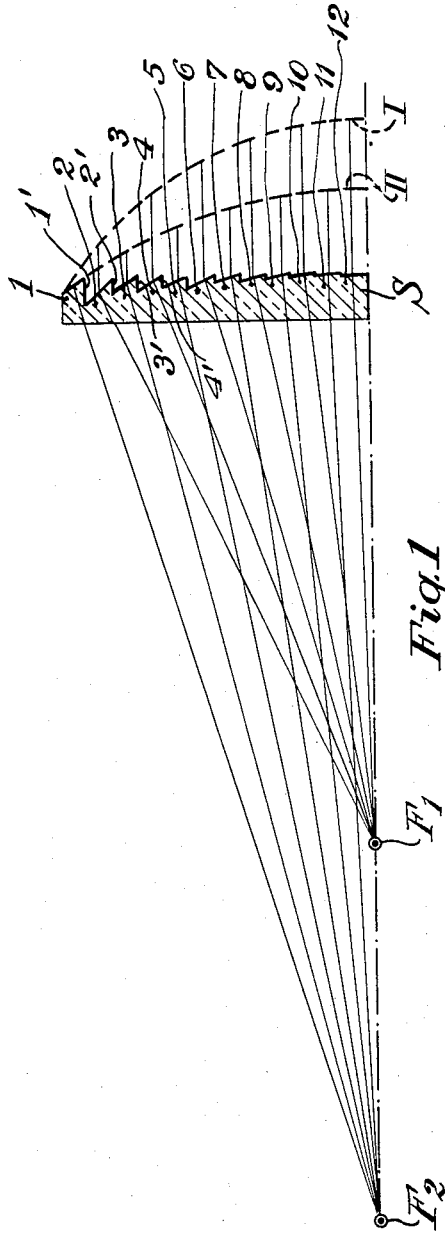
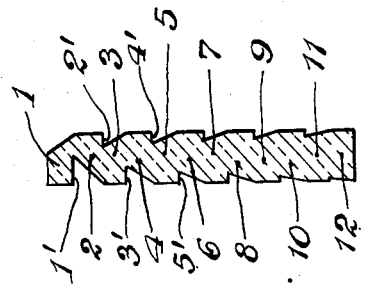
Fig.1
Fig.2
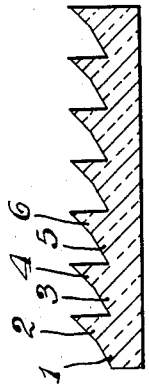
Fig.3
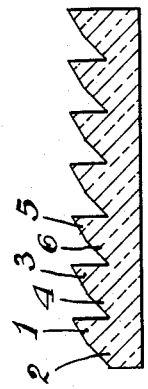
Fig.5
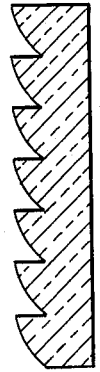
Fig.4
Fig.6
Inventor
Hans Rühle
by Singer, Stern & Carlberg
Attorneys

United States Patent Office 3,004,470
Patented Oct. 17, 1961

3,004,470
MULTIPLE FOCAL LENGTH LENS
Hans Rühle, Stuttgart, Germany, assignor to Zeiss Ikon
A.G. Stuttgart, Stuttgart, Germany
Filed July 24, 1957, Ser. No. 673,800
Claims priority, application Germany July 28, 1956
7 Claims. (Cl. 88—57)

The invention relates to improvements in multiple focal length lenses, preferably employed as field lenses in single lens mirror reflex cameras for the purpose of brightening up the image appearing in the finder of the camera.

It has been proposed heretofore to employ field lenses for brightening up the finder image in a single lens mirror reflex camera. A satisfactory illumination of the finder image without using a frosted surface is possible only when the pupil of the camera lens is projected in the proximity of the pupil of the eye of the observer as it is the case in telescopes. Since the distance of the finder image from the eye can be varied only a small extent the optical laws require that the distance of the pupil of the camera lens from the finder image must not be changed to any substantial extent. In case interchangeable objective systems of different focal lengths are used with the camera, the distance of the pupil of the camera objective from the image plane will be changed whenever another objective is employed. In order to be able to form an image in the camera objective pupil in the pupil of the observer's eye in any position of the camera objective, interchangeable field lenses would have to be used which are adjusted to the camera objective being used.

The field lens, together with other optical elements which are necessary for producing the finder image is often combined into a single structural unit, so that the interchangeability of the field lens cannot be effected without difficulty. In case an interchangeability is dispensed with, it is necessary to design the field lenses as a multiple focal length lens. Such multiple focal lens permits simultaneous production of images from objects located different distances away from the camera in that certain portions of the lens are designed for one focal length and the rest of the lens is designed for a different focal length. When an image of the pupil of the camera objective is projected in the proximity of the eye when changing the focal length, the different powers of refraction should be extended over the whole surface of the lens but this is practically impossible.

In view of the foregoing it is an object of the present invention to eliminate the disadvantageous replacement of the field lens when in a camera the objective having a certain focal length is replaced by an objective having a different focal length.

Another object of the invention is to design the multiple focal length lens as a stepped Fresnel type lens so as to obtain the distribution of the two differing powers of refraction at least approximately over the whole surface of the lens.

Stepped Fresnel type lenses are known. They consist of a plurality of annular rings, the surfaces of which have the same inclination to the optical axis as the spherical or aspherical surface of a corresponding field lens in the range of the respective annular rings.

When the individual annular steps are provided alternatingly with an inclination corresponding to one or another curvature in accordance with the different focal lengths, both powers of refraction will at least be approximately distributed over the entire surface of the lens. In order to reduce the disturbance of the image impression due to the alternating bright and dark annular rings it is preferred to make the annular steps of sufficiently small width.

A still further object of the invention is to provide a stepped Fresnel type lens having all the annular steps disposed on one side of the lens body. It is, however, also contemplated to arrange the annular steps on opposite sides of the lens body. When the annular steps are arranged on both sides of the lens body they will be advantageously arranged in such a manner that the annular steps having an inclined surface will be disposed opposite annular steps which have surfaces disposed at right angles to the optical axis.

Still another object of the invention is to provide a stepped Fresnel type lens in which the individual annular steps are disposed on opposite sides of the lens and each of the steps contains a surface which is inclined to the optical axis and another surface which is vertical to the optical axis.

A still further object of the invention is to provide a stepped Fresnel type lens in which the annular steps having an inclination which corresponds to one focal length are disposed on one side of the lens body while the opposite side of the lens body is provided with steps of such inclination that the resultant effect of the combined annular steps disposed on opposite sides of the lens body will correspond to another focal length. This arrangement of annular steps whereby the steps are effective only in conjunction with each other can be such that the compensating annular steps disposed on the other side of the lens can be provided over the whole surface of the lens, or only over one or a few single annular steps of the lens.

In case of a stepped Fresnel type lens having a single focal length, the annular steps of different inclination can be distributed over the entire surface of the lens in any desired sequence.

It is known that the effect of any spherical lens is the least in its central portion, and the strongest at its peripheral portion. Therefore, the stepped Fresnel type lenses have in the vicinity of their optical axis annular steps of a smaller inclination than in the peripheral steps. The primary object of the field lenses and thus of stepped Fresnel type lenses is to brighten up the peripheral portions of the finder image because the central portion of same is sufficiently illuminated by the pupil of the camera objective. It is thus possible to design the Fresnel type lenses in accordance with the present invention, with annular steps having different inclinations limited to one portion of the Fresnel type lyens, namely, to its peripheral portion.

The central part of a stepped lens in accordance with the present invention can be provided with means for parallactic shifting of image which, as is well known, are able to perform very accurately the sharp focusing of the objective of a photographic camera. These means are for instance two wedges inclined one against the other with plane or curved surfaces whereby the line of intersection of their slant planes must be in the focusing plane, if no other means are provided for displacing this point of intersection into the focusing plane. In lieu of these means for parallactic shifting of image sharp focusing can also be done by means of a ground glass. Stepped lenses in accordance with the present invention can, therefore, partly be frosted, preferably in those areas free from stepped rings. A very effective arrangement is maintained by providing, in the center of the Fresnel type lens, means for parallactic shifting of image to be enclosed by a frosted area extending either up to the central area with the indicators or, by forming a clear and transparent circular area, only over a part of the area of the Fresnel type lens free from stepped rings.

Other objects and advantages of the invention will be apparent from the following specification, when considered in conjunction with the accompanying drawings, which show by way of example several embodiments of the Fresnel type lens in accordance with the present invention.

In the drawings:

FIG. 1 shows a cross-sectional view of one-half of a stepped lens in accordance with the invention together with two curves I and II corresponding to two different focal lengths.

FIG. 2 shows a modification of the lens according to the invention, and the

FIGS. 3, 4, 5 and 6 show each additional modifications of the annular steps of lenses which may be employed.

Referring to the drawings, and more particularly to FIG. 1 thereof, the stepped lens S is used to replace lenses having curvatures corresponding to the broken lines I and II. The annular steps are arranged in such a manner that both of the curvatures corresponding to the lines I and II will be substantially evenly distributed over the entire surface of the lens. The focal point corresponding to the curved broken line I is indicated at $F_1$ and the corresponding focal point of the curved broken line II is indicated at $F_2$. By way of example the lens is subdivided into twelve annular steps. The first step 1 has an inclined surface, the inclination of which relative to the optical axis corresponds, for instance to the inclination of the line II at the same distance from the optical axis as said step. The inclination of the step 2 corresponds to the inclination of the line I at the same distance from the optical axis as said step 2. The following steps receive alternatingly inclinations corresponding to the respective broken lines I and II at the same distance from the optical axis as the respective step. Thus, a single stepped Fresnel type lens is produced which will fulfill the purpose of two interstacked stepped lenses having different focal lengths.

In FIG. 1 all the steps are arranged on one side of the body of the lens S.

In FIG. 2 the steps corresponding to the curved broken line I are disposed on one side of the lens body and the steps corresponding to the curved broken line II are arranged on the other side of the body of the lens S. The arrangement of the steps is such that each of the annular steps has a surface inclined to the optical axis and an oppositely disposed surface which is vertical to the optical axis.

In the embodiments of the invention as shown in the FIGS. 1 and 2, each annular step is separated from the next step by an annular surface 1', 2', 3', etc., which is parallel to the optical axis. The above mentioned narrow surfaces between the adjacent steps may produce shadings which are apt to disturb the viewing of the image. This phenomenon can be substantially reduced in that at least two adjacent steps of differing inclination, e.g. steps 1 and 2, are staggered relative to each other in the direction of the optical axis in such a manner that their surfaces which are inclined to the optical axis are directly in alignment with each other, so as to eliminate the intermediate surface, e.g. the surface 1'. Hereby, starting with the outer edge of the lens there will first be provided an annular step with a great inclination, followed by a step with a smaller inclination. Such an arrangement is shown in FIG. 3 wherein the step sequence is: 2, 1; 4, 3; 6, 5 . . . in which the steps 2, 1; 4, 3; 6, 5; . . . are combined to pairs within which no shade producing edges appear which would produce shading in the finder image.

When, as shown in FIG. 4, the start is made from the edge of the lens body with an annular step having a small inclination, a Fresnel type lens will be produced in which odd and even numbers of steps are combined to annular pairs, such as 1, 2; 3, 4; 5, 6; etc.

Instead of two different inclinations of two surfaces formed by the annular pairs of steps as shown in FIGS. 3 and 4 the steps can be designed also to have a continuous or curved inclination as shown in FIGS. 5 and 6. FIG. 3 would be changed into a lens as shown in FIG. 6 and FIG. 4 would be changed into a lens as shown in FIG. 5.

What I claim is:

1. In a multiple focal length field lens for use in finders in single lens reflex cameras with interchangeable lens systems, a lens body, a first series of concentrically arranged and radially spaced annular surface sections of radially inwardly progressively greater inclination relative to the optical axis on one side of said lens body, said surface sections having a common focus, and a second series of concentrically arranged and radially spaced annular surface sections of radially inwardly progressively greater inclination relative to the optical axis on the other side of said lens body and arranged between said first series of concentrically arranged and radially spaced annular surface sections, said second series of annular surface sections having a common focus which is different from the focus of said first series of annular surface sections.

2. The field lens as set forth in claim 1, in which said second annular surface sections are arranged opposite the intervals between said first annular surface sections on the other side of said lens body.

3. The field lens as set forth in claim 1, in which the axially outer edges of said first annular surface sections are disposed in a first common plane, and the axially outer edges of said second annular surface sections are disposed in a second common plane parallel with said first common plane.

4. The field lens as set forth in claim 1, in which the annular surface sections of said lens body intermediate said first annular surface sections and intermediate said second annular surface sections are perpendicular to the optical axis of the lens.

5. The field lens as set forth in claim 1, in which said first and second annular surface sections cover the marginal portions of said lens body only.

6. The field lens as set forth in claim 1, in which said first and second annular surface sections are separated by cylindrical surface sections symmetrical relative to the optical axis of the lens.

7. The field lens as set forth in claim 1, in which each of said first annular surface sections merges with an adjacent annular surface section of the second series.

References Cited in the file of this patent

UNITED STATES PATENTS

| | | |
|---|---|---|
| 1,033,781 | Churchill | July 30, 1912 |
| 1,483,636 | Horni | Feb. 12, 1924 |
| 1,504,970 | Pascucci | Aug. 12, 1924 |
| 1,572,236 | Frederick | Feb. 9, 1926 |
| 1,915,418 | Heymer | June 27, 1933 |
| 1,986,065 | Maillet | Jan. 1, 1935 |
| 2,003,804 | Falge | June 4, 1935 |
| 2,124,587 | Morrissey | July 26, 1938 |
| 2,200,646 | Strong et al. | May 14, 1940 |
| 2,353,257 | Mihalyi | July 11, 1944 |
| 2,588,373 | Erban | Mar. 11, 1952 |
| 2,589,014 | McLeod | Mar. 11, 1952 |
| 2,706,930 | Jansen | Apr. 26, 1955 |
| 2,881,686 | Ruhle | Apr. 14, 1959 |

FOREIGN PATENTS

| | | |
|---|---|---|
| 335,696 | Great Britain | Oct. 2, 1930 |
| 429,340 | Great Britain | May 27, 1935 |
| 660,352 | Great Britain | Nov. 7, 1951 |
| 713,929 | France | Aug. 24, 1931 |
| 902,370 | France | Dec. 4, 1944 |